(12) United States Patent
Taniguchi (10) Patent No.: US 8,046,583 B2
(45) Date of Patent: Oct. 25, 2011

(54) WIRELESS TERMINAL

(75) Inventor: Hiroyuki Taniguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1429 days.

(21) Appl. No.: 11/495,211

(22) Filed: Jul. 28, 2006

(65) Prior Publication Data

US 2007/0264965 A1    Nov. 15, 2007

(30) Foreign Application Priority Data

Mar. 29, 2006  (JP) .................................. 2006-090494

(51) Int. Cl.
*H04L 9/32* (2006.01)
*G06F 21/00* (2006.01)
(52) U.S. Cl. .......................... 713/171; 380/270; 713/155
(58) Field of Classification Search .................. 380/270; 713/155, 171
See application file for complete search history.

(56) References Cited

U.S. PATENT DOCUMENTS

| 2002/0191572 | A1 | 12/2002 | Weinstein et al. | |
| 2004/0077335 | A1* | 4/2004 | Lee et al. ....................... | 455/410 |
| 2004/0158639 | A1 | 8/2004 | Takusagawa et al. | |
| 2006/0196931 | A1* | 9/2006 | Holtmanns et al. ........... | 235/380 |
| 2007/0041344 | A1* | 2/2007 | Yaqub et al. ................... | 370/331 |
| 2010/0008507 | A1* | 1/2010 | Galante et al. ................. | 380/278 |

FOREIGN PATENT DOCUMENTS

| JP | 2003-60653 | | 2/2003 |
| JP | 2004-207965 | | 7/2004 |
| JP | 2004-208073 | A | 7/2004 |
| JP | 2004-254277 | | 9/2004 |

OTHER PUBLICATIONS

Japan Patent Office: Office Action mailed Nov. 30, 2010 in JP Patent Application No. 2006-090494, with English-language translation.
Mobile Broadband Association, "Misauth Protocol Specifications", [online], Jun. 30, 2004, [Retrieved Nov. 15, 2010], Internet, URL, http://www.mobile-broadband.org/j-services/mbas0301.pdf. Pursuant to MPEP §609, in fulfillment of the requirement under 37 CFR §1.98(a)(3)(i) for a concise explanation of relevance regarding this cited reference, the Office's attention is directed to the English-language translation of the Office Action issued by the Japan Patent Office for JP Patent Application No. 2006-090494, cited hereinabove.

* cited by examiner

*Primary Examiner* — Gilberto Barron, Jr.
*Assistant Examiner* — Malcolm Cribbs
(74) *Attorney, Agent, or Firm* — Fujitsu Patent Center (57) ABSTRACT

A wireless terminal stores shared information, which is shared in authentication processing executed between the wireless terminal and an authentication device when the wireless terminal logs on to a first base station. When the connection destination is to be switched from the first base station to another base station (a second base station), a new shared key is created from the shared information which has been stored, and is sent to the authentication device via the second base station. In the case where the authentication device judges the new shared key as valid through validity judging processing with the use of the shared information, a new shared key is created to be sent from the authentication device to the second base station. An encryption key that is encrypted with this new shared key to be used in wireless communications between the wireless terminal and the second base station is received from the second base station. The encrypted encryption key is decrypted with the new shared key and, using this encryption key, the wireless terminal executes wireless communications with the second base station.

8 Claims, 9 Drawing Sheets

WIRELESS TERMINAL

BACKGROUND OF THE INVENTION

1. Field of the Invention

The present invention relates to a wireless terminal and an authentication device.

2. Description of the Related Art

Various wireless communication systems, typically, IMT-2000 and wireless LANs, are increasing in number. Also, the popularization of information terminals such as PCs (personal computers) and PDAs (Personal Digital Assistants) with a wireless communication function, has paved the way to an environment where various services can be received over a network at any time and any place. Real-time applications including telephone services and video distribution with the use of mobile terminals, such as mobile PCs, PDAs and IP cellular phones, are especially attracting attention in recent years.

On the other hand, there is a concern that the increase in number of users of services provided via a network could increase crimes utilizing communication networks such as impersonation and eavesdropping. Security measures for preventing those crimes therefore take importance.

The security measures include user authentication and communication encryption technologies. User authentication is used to prevent impersonation of a user or a communication device and alteration of communications. Also, for service providers, user authentication is a necessary function in order to provide services to authorized subscribers. Communication encryption is used to prevent eavesdropping of communications. Cases that are considered to need communication encryption in particular are the ones where wireless LANs or the like are employed as devices relaying communications over radio waves that are available to general public.

When a user logs on to a network such as a public wireless LAN, a mobile terminal first has to detect a wireless LAN access point where a service is provided and start wireless access. In most cases, the provider of the service performs authentication (user authentication) at this point in order to identify the user as a subscriber of the service. In some cases, the user performs authentication (server authentication) in order to identify the detected access point as authentic equipment installed by the service provider. After the authentication, the wireless access is established and the network can be used while eavesdropping of communications is prevented with the use of an encryption key (access key) shared between the wireless LAN access point or the like and the user's mobile terminal. The service is executed over the established network by an application such as VoIP.

In radio wave communications over a wireless LAN or the like, the limited propagation range of radio wave necessitates handover processing, in which wireless LAN access points or other communication bases that the user can log on to are detected again for reconnection when the user is on the move. Upon reconnection, the mobile terminal needs to perform authentication between the mobile terminal and a new wireless base station (access point). Accordingly, the mobile terminal cannot use radio wave for communications since the mobile terminal reconnection processing is started until the reauthentication is completed. In the case where the handover processing takes place while the user is communicating through VoIP, a prolonged communication interruption is felt by the user as audio disruption. Therefore, the quality of the service is deteriorated.

The communication interruption depends on how long user reauthentication takes. Methods employed for user reauthentication include one that uses MAC address assigned to communication interfaces of mobile terminals, one that uses mobile terminal ID, one that uses user ID and password, and one that uses an electronic certification form.

The method using MAC address and the method using mobile terminal ID are capable of relatively quick authentication processing, and thereby do not cause audio disruption to be felt by a user during handover. The MAC address method, in particular, is employed at many wireless LAN access points and is relatively easy to introduce. However, the MAC address method allows the act of faking an MAC address, thus providing weak security with regard to identifying and authenticating a user. Another problem is that the MAC address method is incapable of server authentication for identifying a false wireless LAN access point.

Proposed as the method that uses user ID and password is MIS protocol, which contains authentication processing quick enough to prevent a user from registering audio disruption. MIS protocol makes server authentication, user authentication, and distribution of encryption keys through wireless communications possible with the use of a key shared in advance between a user and a server and dynamic random numbers. However, being a unique protocol, MIS protocol requires dedicated wireless LAN access points, the introduction of which is costly and therefore could be difficult.

The method that uses an electronic certification form makes it possible to execute user authentication and server authentication with a high security level. This method is employed by, among others, IEEE 802.1x and IEEE 802.11i, which are lately becoming popular. Accordingly, the electronic certification method is employed at many wireless LAN access points as one of standard functions of mobile terminals. The method has many authentication sequences that have to be executed between a mobile terminal and an authentication server, and requires a lot of calculation for session keys and encryption keys as well. A problem arisen from employing the electronic certification method is that the speed of authentication processing is not quick while the security level of user authentication and server authentication is high. The method therefore causes audio disruption to be felt by a user during handover processing.

Figure 10:
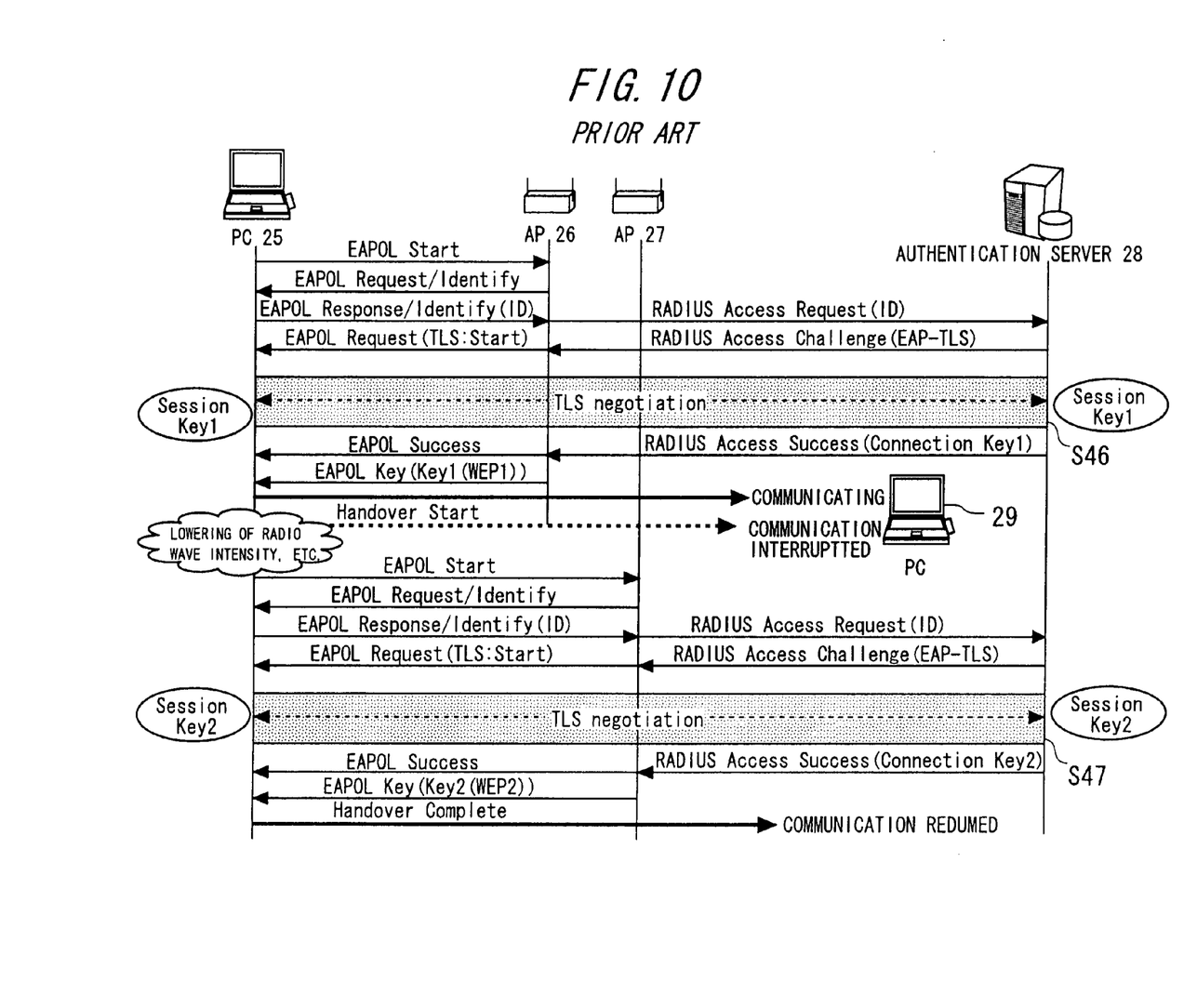
FIG. 10 is a sequence diagram showing handover processing in a system according to prior art.

FIG. 10 shows an example of sequence processing for wireless LAN handover authentication in prior art. There are a mobile terminal (PC) 25, which is a wireless terminal, an authentication server 28, a wireless LAN access point (may be simply referred to as "access point" below) 26, and a wireless LAN access point 27. The access point 26 and the access point 27 are connected to the same authentication server 28, and the distance between the two is set such that their radio wave propagation ranges partially overlap. Hereinafter, wireless LAN handover processing in prior art will be described with reference to FIG. 10.

In the initial state, the wireless terminal 25 is kept turned off or is not logged on to the access point 26. The access point 26 and the access point 27 are connected to the authentication server 28 via a safe network that does not allow eavesdropping, data alteration, and the like. The access point 26 and the access point 27 notify the wireless terminal 25 of their existence by way of beacons or the like, so that the wireless terminal 25 can log on (connect) to the access point 26 or 27.

When the wireless terminal 25 is powered on by a user, or starts logging on to the network via one of the access points, the wireless terminal 25 catches a beacon from the nearer access point and determines an access point to which the wireless terminal 25 makes a wireless LAN connection. In this example, the wireless terminal 25 catches a beacon from the access point 26. The wireless terminal 25 then starts authentication in accordance with the access point 26 and an IEEE 802.1x access control function which is set in advance to the access point 26.

The wireless terminal 25 executes TLS negotiation (an authentication procedure by TLS with the use of an electronic certification form) (S46) with the authentication server 28, and shares an authentication session key (referred to as "session key (1)") with the authentication server 28.

The authentication server 28 creates a connection key (referred to as "connection key (1)") from the session key (1). The authentication server 28 sends the created connection key (1) to the access point 26, where the connection key (1) is used to create an encryption key for use in encrypted communications between the access point 26 and the wireless terminal 25 (the key is referred to as "encryption key (1)"). The access point 26 creates the encryption key (1) from the connection key (1), encrypts the created encryption key (1) with the connection key (1), and sends the encryption key (1) to the wireless terminal 25.

The wireless terminal 25 receives from the access point 26 the encryption key (1) that has been encrypted with the connection key (1). The wireless terminal 25 creates the connection key (1) from the session key (1) that has been kept in the wireless terminal 25, thereby decrypting the encryption key (1) that has been encrypted by and received from the access point 26 and obtaining the encryption key (1). Using the obtained encryption key (1), the wireless terminal 25 executes encrypted communications with a communication partner device 29.

In the case where a user carrying the wireless terminal 25 moves to such a location that lowers the intensity of a radio wave reaching the wireless terminal 25 from the access point 26 while the wireless terminal 25 is logged on to the access point 26, the wireless terminal 25 executes handover processing. The wireless terminal 25 catches a beacon from, for example, the access point 27 near the wireless terminal 25, and determines the access point 27 as a handover destination access point.

The wireless terminal 25 starts authentication in accordance with an IEEE 802.1x access control function which is set in advance to the access point 27. In this case, the TLS authentication processing (S47) is executed as when the wireless terminal 25 logs on to the access point 26. The wireless terminal 25 and the authentication server 28 then discard the session key (1) and the connection key (1), so that a new session key (referred to as "session key (2)") is shared between the wireless terminal 25 and the authentication server 28.

The authentication server creates from the session key (2) a new connection key (referred to as "connection key (2)"), and sends the created connection key (2) to the access point 27, where the connection key (2) is used to create a new encryption key for use in encrypted communications between the access point 27 and the wireless terminal 25 (the key is referred to as "encryption key (2)"). The access point 27 creates the encryption key (2) from the connection key (2), encrypts the created encryption key (2) with the connection key (2), and sends the encryption key (2) to the wireless terminal 25.

The wireless terminal 25 receives from the access point 27 the encryption key (2) that has been encrypted with the connection key (2). The wireless terminal 25 creates the connection key (2) from the session key (2) that has been kept in the wireless terminal 25, thereby decrypting the encryption key (2) that has been encrypted by and received from the access point 27 and obtaining the encryption key (2). Using the obtained encryption key (2), the wireless terminal 25 executes encrypted communications with the communication partner device 29.

When the wireless terminal 25 switches the wireless connection destination (handover) from the access point 26 to the access point 27 as this, the authentication takes approximately one second, which is long enough to cause a problem that it is impossible for the wireless terminal 25 to avoid an interruption in sound received from the other wireless terminal 29 during handover.

The following is a list of prior art documents related to the present invention:
[Patent document 1] JP 2004-207965 A
[Patent document 2] JP 2004-254277 A
[Patent document 3] JP 2003-60653 A

SUMMARY OF THE INVENTION

An object of the present invention is to provide a wireless device, an authentication device, and a program that execute quicker handover processing in wireless communications using authentication by means of an electronic certification form.

In order to attain the object, the present invention employs the following configurations.

(1) To be more specific, a wireless terminal according to the present invention executes authentication processing between itself and an authentication device when forming a wireless connection with a base station, and shares, with the authentication device, a shared key for creating an encryption key that is used in wireless communications with a base station, the wireless terminal including:

a storage portion to store shared information, which is created in authentication processing executed between the wireless terminal and the authentication device when the wireless terminal logs on to a first base station, and which is shared with the authentication device;

a creation portion to create, from the shared information which is stored in the storage portion, when the connection destination is switched from the first base station to another base station (a second base station), a new shared key for creating an encryption key that is used in wireless communications with the second base station;

a unit to notify the authentication device of the new shared key via the second base station;

a unit to receive, from the second base station, when the new shared key is judged to be valid by the authentication device through validity judging processing with the use of the shared information, an encryption key that is used in wireless communications between the wireless terminal and the second base station, the received encryption key being created from the new shared key, which is notified from the authentication device to the second base station, and being encrypted with the new shared key; and a unit to decrypt the encrypted encryption key with the new shared key and executing wireless communications with the second base station using the encryption key.

(2) A wireless terminal according to the present invention may send the new shared key, along with an authentication identifier of the wireless terminal, to the authentication device when switching is made to the second base station.

(3) Further, a computer-readable medium storing a program according to the present invention makes a computer function as a wireless terminal which executes authentication processing between itself and an authentication device when forming a wireless connection with a base station, and which shares, with the authentication device, a shared key for creating an encryption key that is used in wireless communications with a base station, the program causing the computer to execute the steps of:

storing shared information, which is created in authentication processing executed between the wireless terminal and the authentication device when the wireless terminal logs on to a first base station, and which is shared with the authentication device;

creating, from the shared information which is stored in the storage portion, when the connection destination is switched from the first base station to another base station (a second base station), a new shared key for creating an encryption key that is used in wireless communications with the second base station;

notifying the authentication device of the new shared key via the second base station;

receiving, from the second base station, when the new shared key is judged to be valid by the authentication device through validity judging processing with the use of the shared information, an encryption key that is used in wireless communications between the wireless terminal and the second base station, the received encryption key being created from the new shared key, which is notified from the authentication device to the second base station, and being encrypted with the new shared key; and decrypting the encrypted encryption key with the new shared key and executing wireless communications with the second base station using this encryption key.

(4) Further, an authentication device according to the present invention executes authentication processing between the authentication device itself and a wireless terminal when the wireless terminal starts wireless communications with a base station, and shares, with the wireless terminal, a shared key for creating an encryption key that is used in the wireless communications, the authentication device including:

a storage portion to store shared information, which is created in authentication processing executed between the wireless terminal and the authentication device when the wireless terminal starts wireless communications with a first base station, and which is shared with the wireless terminal;

a unit to receive, when the wireless terminal switches the connection destination from the first base station to another base station (a second base station), a new shared key for creating an encryption key that is created by the wireless terminal to be used in wireless communications with the second base station, the new shared key being received via the second base station;

a judging portion to determine whether the new shared key received is valid or not with the use of the shared information; and a unit to notify, when the new shared key is valid, the second base station of the new shared key without performing the authentication processing, thereby enabling the second base station to create and send an encryption key to the wireless terminal.

(5) Further, a computer-readable medium storing a program according to the present invention makes a computer function as an authentication device which executes authentication processing between itself and a wireless terminal when the wireless terminal starts wireless communications with a base station, and which shares, with the wireless terminal, a shared key for creating an encryption key that is used in the wireless communications, the program causing the computer to execute the steps of:

storing shared information, which is created in authentication processing executed between the wireless terminal and the authentication device when the wireless terminal starts wireless communications with a first base station, and which is shared with the wireless terminal;

receiving, when the wireless terminal switches the connection destination from the first base station to another base station (a second base station), a new shared key for creating an encryption key that is created by the wireless terminal to be used in wireless communications with the second base station, the new shared key being received via the second base station;

determining whether the new shared key received is valid or not with the use of the shared information; and notifying, when the new shared key is valid, the second base station of the new shared key without performing the authentication processing, thereby enabling the second base station to send an encryption key to the wireless terminal.

The present invention makes it possible to provide a wireless device, an authentication device, and a program that execute quicker handover processing in wireless communications using authentication by means of an electronic certification form.

DETAILED DESCRIPTION OF THE PREFERRED EMBODIMENT

As an embodiment of the present invention, a description will be given on a technique of achieving quick handover with excellent cost performance that is adaptable to real-time applications such as VoIP and that makes secure authentication by means of an electronic certification form and key distribution possible without replacing standard wireless communication bases.

To be specific, described below is a new authentication processing algorithm which executes authentication between a user's mobile terminal and a wireless base station (or a server) without affecting an IEEE 802.1x or similar access control function of a standard wireless base station that corresponds to electronic certification form authentication, and which encrypts a wireless section encryption key and distributes the key to a mobile terminal specified by a wireless base station without affecting an IEEE 802.1x or similar function of a standard wireless base station of creating and distributing an encryption key that corresponds to electronic certification form authentication. Hereinafter, a handover authentication system according to an embodiment of the present invention will be described with reference to drawings. The configuration of the following embodiment is given for an exemplification purpose only, and the present invention is not limited thereto.

<<System Configuration>>

Figure 1:
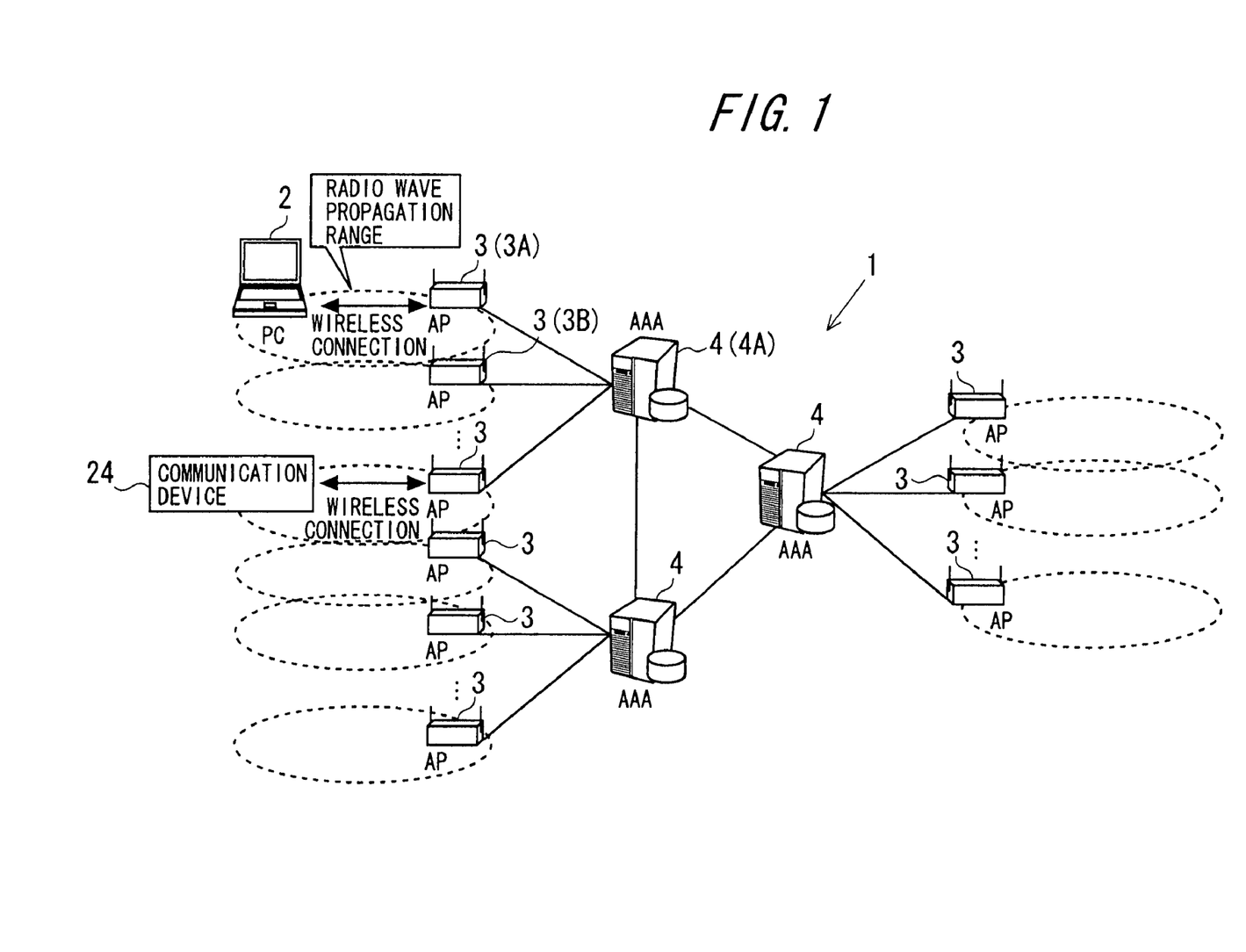
FIG. 1 is a basic configuration diagram showing a system according to an embodiment of the present invention.

FIG. 1 is a system configuration diagram of a handover authentication system 1. The handover authentication system 1 in FIG. 1 contains a wireless terminal 2, which is used by a user, a wireless LAN access point (AP) 3, which can form a wireless connection with the wireless terminal 2, and an authentication server (AAA) 4, which is connected to the wireless LAN access point 3 via a secure network.

In FIG. 1, plural access points 3 are connected to the authentication server 4. An access point 3A and an access point 3B are connected to an authentication server 4A via a secure network. The wireless terminal 2 is in wireless connection with the access point 3A.

The wireless terminal 2 contains a network interface having an authentication function that corresponds to electronic certification form authentication (e.g., TLS authentication), an encrypted communication function, and an IEEE 802.1x or a similar network access control function.

The wireless terminal 2 is a mobile terminal, and is assumed to be a personal computer (PC) in this embodiment. Alternatively, a mobile terminal serving as the wireless terminal 2 may be terminals such as a PDA and a VoIP-dedicated machine, or a network card. The network interface in this embodiment is an IEEE 802.11 wireless LAN network interface. Instead of an IEEE 802.11 wireless LAN network interface, an IEEE 802.16 WiMAX or other network interfaces that are applicable to the handover authentication system 1 may be employed.

The access point 3 is a wireless base station of the wireless terminal 2 whose network interface has a session key-based encryption key creating function corresponding to electronic certification form authentication and an IEEE 802.1x or a similar network access control function. This embodiment uses an IEEE802.11 wireless LAN as an example, but other wireless base stations such as IEEE 802.16 WiMAX may be employed as long as conditions of this embodiment are met.

The authentication server 4 is a server having an authentication function that corresponds to electronic certification forms and a session key creating function. The authentication server 4 is an independent server machine in this embodiment. Alternatively, the wireless LAN access point 3 or other devices may have the functions of the authentication server 4.

<Configuration Example of Wireless Terminal>

Figure 2:
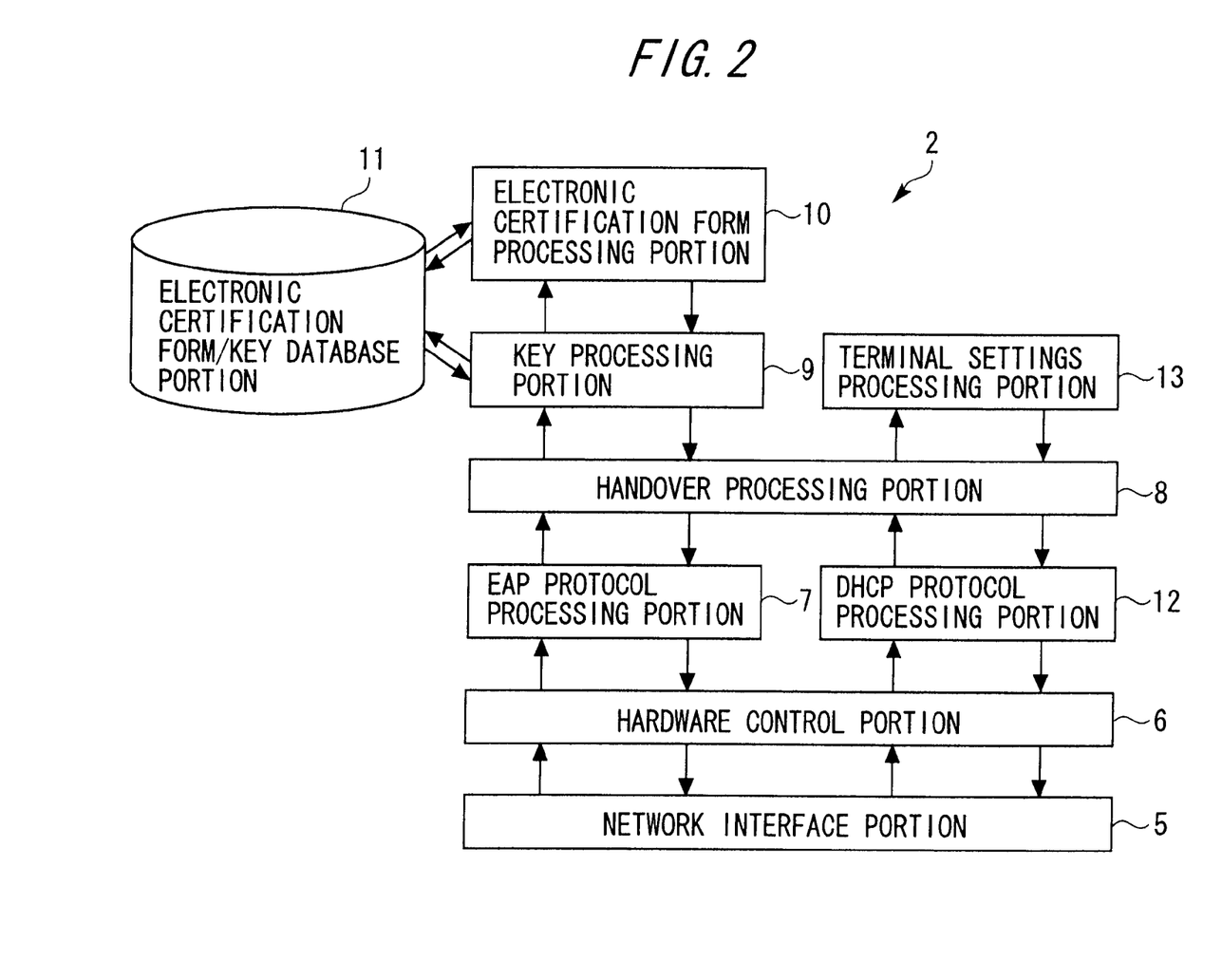
FIG. 2 is a function block diagram of a wireless terminal according to the embodiment of the present invention.

FIG. 2 is a function block diagram showing functions of the wireless terminal 2. The wireless terminal 2 has a network interface portion 5, a hardware control portion 6, an EAP (Extensible Authentication Protocol) protocol processing portion 7, a handover processing portion 8, a key processing portion 9, an electronic certification form processing portion 10, an electronic certification form•key database portion 11, a DHCP (Dynamic Host Configuration Protocol) protocol processing portion 12 and a terminal settings processing portion 13.

An operation example of these components will be described in detail with reference to a sequence diagram of FIG. 5.

<Configuration Example of Authentication Server>

Figure 3:
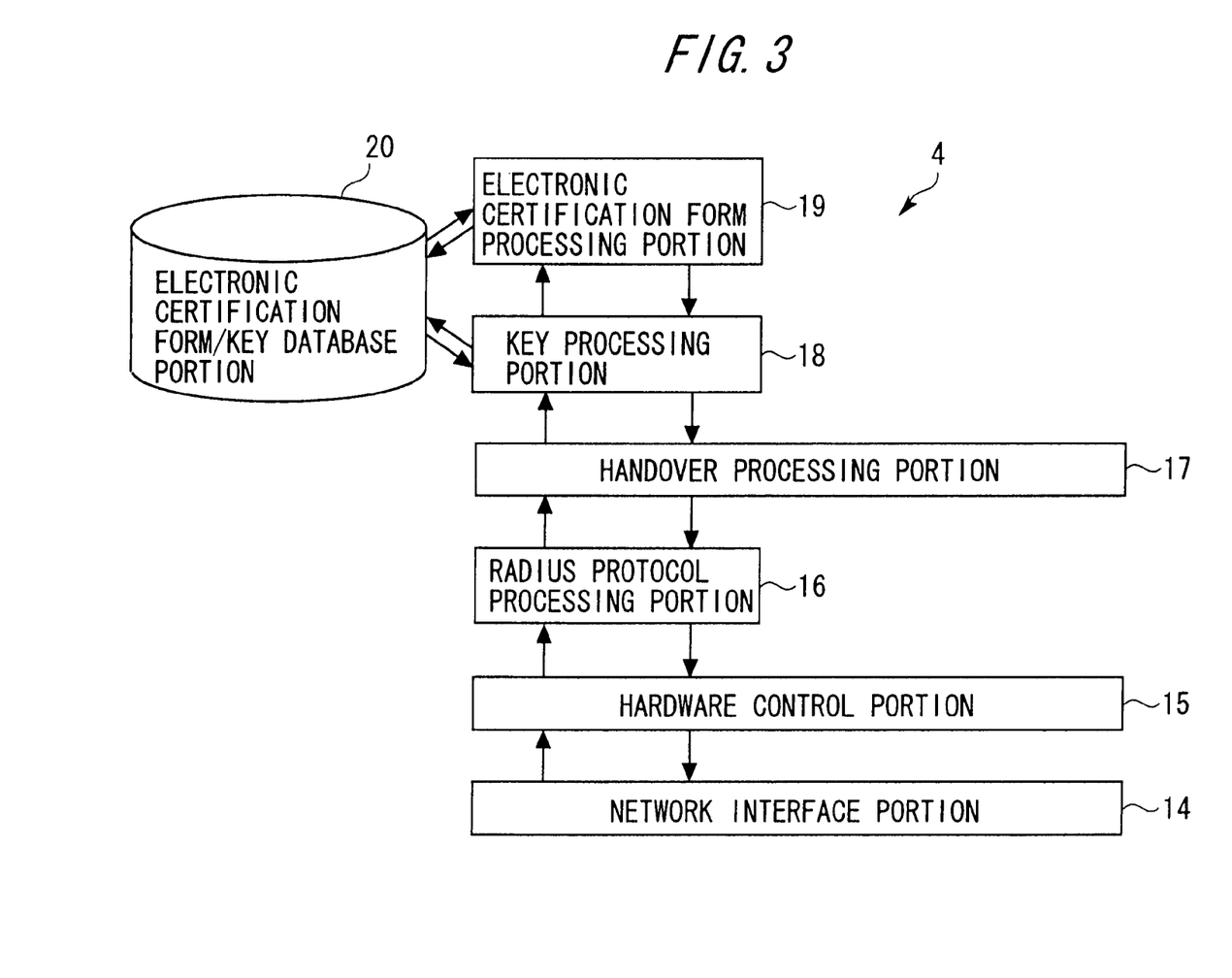
FIG. 3 is a function block diagram of an authentication server according to the embodiment of the present invention.

FIG. 3 is a function block diagram showing functions of the authentication server 4. The authentication server 4 has a network interface portion 14, a hardware control portion 15, a RADIUS (Remote Authentication Dial In User Service) protocol processing portion 16, a handover processing portion 17, a key processing portion 18, an electronic certification form processing portion 19 and an electronic certification form•key database portion 20.

An operation example of these components will be described in detail with reference to the sequence diagram of FIG. 5.

<Example of Data Configuration>

Figure 4:
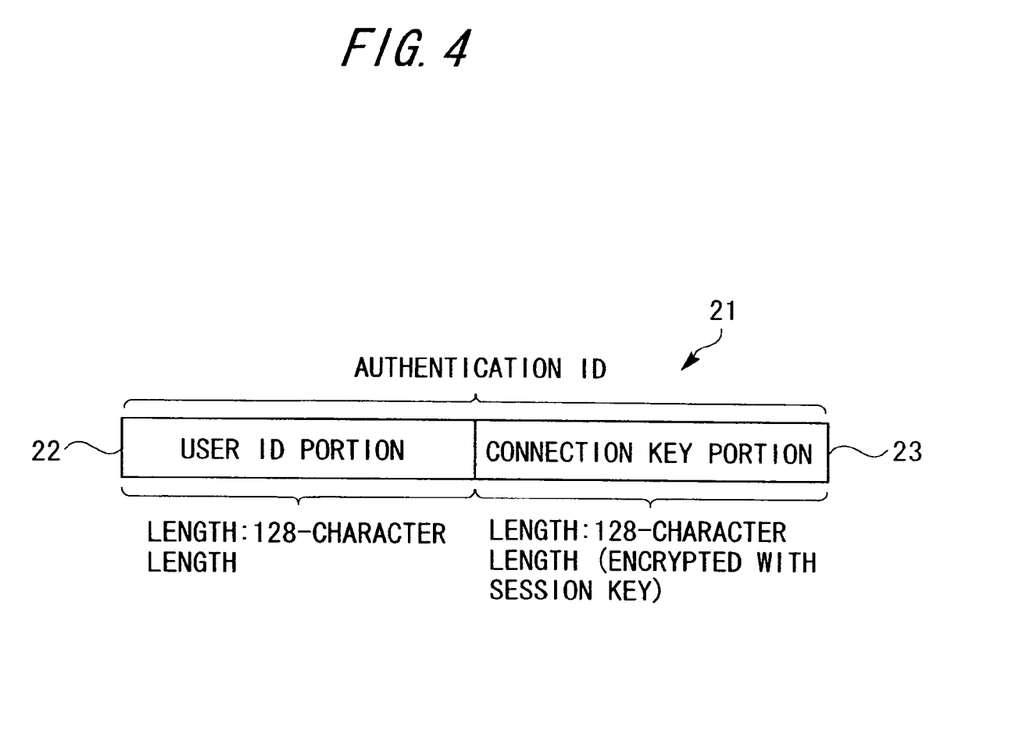
FIG. 4 is a diagram showing an authentication ID format according to the embodiment of the present invention.

Described below with reference to FIG. 4 is the data configuration of an authentication ID 21, which is used for identification of the wireless terminal 2 (user). The authentication ID 21 is composed of a user ID portion 22 and a connection key portion 23.

The user ID portion 22 has an information capacity corresponding to 128 characters. The user ID portion 22 has a function of storing an ID that indicates a user. The connection key portion 23 has a function of storing as much information as 128 characters aside from user ID information.

The authentication ID 21 functions as an ID used in EAP protocol, which is regulated by RFC 2284 of IETF or the like. The authentication ID 21 also functions as data having attributes of User-Name in the RADIUS protocol, which is regulated by RFC 2865 of IETF or the like.

<Example of Sequence Processing>

Hereinafter, an example of sequence processing of the handover authentication system 1 shown in FIG. 1 will be described with reference to FIG. 5. FIG. 5 illustrates a case in which the wireless terminal (PC) 2 first logs on to the access point 3A and then to the access point 3B through handover. The access point 3A and the access point 3B are connected to the authentication server 4A via a secure network.

The distance between the access point 3A and the access point 3B is set such that their radio wave propagation ranges partially overlap. Hereinafter, a description is given with reference to FIG. 5 on handover sequence processing by the handover authentication system 1.

Described first is processing in Steps S1 to S11 since the wireless terminal 2 executes authentication with the authentication server 4 until the wireless terminal 2 executes encrypted communications with another wireless terminal 24 (FIG. 1) via the access point 3A.

In the initial state of this sequence, the wireless terminal 2 is kept turned off or is not logged on to the access point 3A or any other access points.

The access points 3A and 3B notifies the wireless terminal 2, which is about to log on to the access point 3A, of their presence by, for example, sending beacon signals toward the wireless LAN.

As the wireless terminal 2 is powered on by a user, or starts logging on to the network, the wireless terminal 2 catches a beacon signal from an access point that is near the wireless terminal 2 and determines an access point through which the wireless terminal 2 logs on to the wireless LAN. In this example, the wireless terminal 2 receives a beacon signal from the access point 3A and determines to log on to the access point 3A.

Then the wireless terminal 2 starts authentication in accordance with an IEEE 802.1x access control function (EAPOL: Extensible Authentication Protocol over LAN) which is set in advance to the access point 3A.

To be specific, the wireless terminal 2 sends a message to the access point 3A requesting the start of EAPOL (connection request signal: EAPOL Start) with the access point 3A (Step S1). The access point 3A receives the connection request signal and sends a message requesting an authentication ID (EAPOL Request/Identify) to the wireless terminal 2 (Step S2).

The wireless terminal 2 reads the authentication ID out of its electronic certification form•key database portion 11 (FIG. 2), and sends a message containing the authentication ID (EAPOL Request/Identify (ID)) to the access point 3A (Step S3).

The access point 3A sends, to the authentication server 4A, an authentication request message containing the authentication ID of the wireless terminal 2 (RADIUS Access Request (ID)) in accordance with the RADIUS protocol (Step S4).

Receiving the authentication request message from the access point 3A, the authentication server 4 sends, to the access point 3A, a message indicating that EAP-TLS, which is a form of authentication protocol EAP for executing TLS (Transport Layer Security) authentication, is employed in user authentication executed between the wireless terminal 2 and the authentication server 4 (RADIUS Access Challenge (EAP-TLS)) (Step S5).

In accordance with the message received from the authentication server 4A, the access point 3A sends, to the wireless terminal 2, a message instructing to start TLS authentication (EAPOL Request (TLS: Start)) (Step S6).

As the wireless terminal 2 receives the TLS authentication start message from the access point 3A, TLS authentication (TLS negotiation) by means of an electronic certification form is executed between the wireless terminal 2 and the authentication server 4 (Step S7). Through the TLS negotiation, the authentication of the wireless terminal 2 and the authentication server 4A is executed, and the wireless terminal 2 creates a session key (referred to as "session key (1)") as shared information to share the session key with the authentication server 4A.

The authentication server 4A creates from the session key (1) a connection key (referred to as "connection key (1)"), which is a shared key, and sends an authentication success message containing the connection key (1) (RADIUS Access Success (Connection Key 1)) to the access point 3A (Step S8).

Receiving the authentication success message, the access point 3A sends a signal indicating the success of EAP-TSL authentication (EAPOL success message: EAPOL Success) to the wireless terminal 2 (Step S9).

The access point 3A subsequently creates, from the connection key (1) received from the authentication server 4A, an encryption key for executing encrypted communications in a wireless section between the wireless terminal 2 and the access point 3A (the key is referred to as "encryption key (1)"). The access point 3A encrypts the created encryption key (1) with the connection key (1), and sends the encryption key (1) to the wireless terminal 2 (Step S10).

The wireless terminal 2 uses the connection key (1) that is created by the key processing portion 9 (FIG. 2) from the session key (1), to decrypt the encryption key (1) that has been encrypted with the connection key (1), and obtain the encryption key (1). The wireless terminal 2 executes communications with the other wireless terminal 24 using the thus obtained encryption key (1) (S11).

Through the procedure described above, the wireless terminal 2 is logged on to the access point 3A, authentication processing using an electronic certification form is executed between the wireless terminal 2 and the authentication server 4A and, when the authentication is successful, communications between the wireless terminal 2 and the other wireless terminal 24 are executed.

The connection key (1) in the foregoing description may be the same key as the session key (1). In other words, the step of creating the connection key (1) from the session key (1) may be omitted from the procedure described above to execute transmission of the session key (1) and encryption/decryption using the session key (1).

Described next is processing in Steps S12 to S20 where the wireless terminal 2 switches from a wireless connection with the access point 3A to a wireless connection with the access point 3B (handover).

When the intensity of a radio wave the wireless terminal 2 receives from the access point 3A weakens as a result of, for example, shift of the wireless terminal 2 while the wireless terminal 2 is logged onto the access point 3A, the wireless terminal 2 starts handover processing (Step S12). During the handover processing, communications between the wireless terminal 2 and the communication partner device (correspondent node) 24 are interrupted.

The wireless terminal 2 determines a handover destination access point by catching a signal from a close access point. In this example, the wireless terminal 2 catches a signal (beacon signal) from the access point 3B, which is in the vicinity, and determines the access point 3B as a handover destination. In other words, the wireless terminal 2 receives radio waves from access points and measures the radio wave intensity of the access points. The wireless terminal 2 chooses, for example, an access point whose radio wave exhibits the highest intensity among the received radio waves, and determines this access point (the access point 3B in this example) as a handover connection destination.

Then the wireless terminal 2 starts authentication in accordance with an IEEE 802.1x access control function which is set in advance to the access point 3B (Step S13). Processing in Step S13 and S14 is similar to the one in Steps S1 and S2 described above, and the wireless terminal 2 is requested by the access point 3B to provide its authentication ID. The wireless terminal 2 reads, out of the electronic certification form•key database portion 11, the session key (1) that has been used in logging on to the access point 3A and has been kept. From the read session key (1), the wireless terminal 2 creates a connection key (referred to as "connection key (2)") as a new shared key using a given method (e.g., calculation using hash function). The wireless terminal 2 attaches the connection key (2) that is encrypted with the session key (1) to the connection key portion 23 (FIG. 4) in the authentication ID 21 of the wireless terminal 2, and sends the authentication ID 21 to the access point 3B (Step S15).

The access point 3B sends, to the authentication server 4A, the authentication ID 21 received from the wireless terminal 2 (RADIUS Access Request (ID+h(Key 2)) (Step S16).

Receiving the authentication ID, the authentication server 4A judges whether or not additional information has been attached to this authentication ID. In other words, whether or not the authentication ID has the connection key portion 23 (FIG. 4) attached thereto is judged. In the case where the connection key portion 23 is attached to the authentication ID (in the case where the received authentication ID is the authentication ID 21 (FIG. 4)), the authentication server 4A recognizes the request as the one for handover of the wireless terminal 2. In the case where the authentication ID does not have additional information (the connection key portion 23), the authentication server 4A recognizes the request as the one for normal wireless terminal log-in (authentication). Judging that the wireless terminal 2 is about to execute handover, the authentication server 4A decrypts, with the session key (1), the encrypted connection key (2) that is contained in the received authentication ID 21. The authentication server 4A then creates a connection key from the session key (1) using the same method that is employed by the wireless terminal 2 in creating the connection key (2). The authentication server 4A judges whether or not the created connection key is the same as the connection key (2) obtained from the authentication ID 21 and, when it is, judges that the connection key (2) sent from the wireless terminal 2 is valid and that the authentication is successful. When the two connection keys have different values, the connection key (2) is deemed as invalid and the authentication fails.

Judging that the connection key (2) from the wireless terminal 2 is valid (namely, the two connection keys are the same), the authentication server 4A sends an authentication success message containing the connection key (2) (RADIUS Access Success) to the access point 3B (Step S17).

Receiving the authentication success message from the authentication server 4A, the access point 3B sends an authentication success message (EAPOL Success) to the wireless terminal 2 (Step S18).

The access point 3B subsequently creates, from the connection key (2), an encryption key used for encrypted communications in a wireless section between the wireless terminal 2 and the access point 3B (the key is referred to as "encryption key (2)"). The access point 3B encrypts the created encryption key (2) with the connection key (2), and sends the encryption key (2) to the wireless terminal 2 (Step S19).

The wireless terminal 2 decrypts the encryption key (2) with the connection key (2). Using the obtained encryption key (2), the wireless terminal 2 resumes communications with the other wireless terminal 24 (Step S20).

In the manner described above, the wireless terminal 2 executes handover processing for switching a wireless connection destination from the access point 3A to the access point 3B. Unlike prior art, in Steps S11 to S20, the session key (1) of the authentication via the handover source access point 3A is not discarded upon handover. Instead, the wireless terminal 2 creates from this session key (1) the connection key (2) that is used for communications via the handover destination access point 3B, and notifies the authentication server 4A. The authentication server 4A judges the validity of the wireless terminal 2 (performs authentication on the wireless terminal 2) by judging the validity of the connection key (2). Repeating the TLS negotiation upon handover can thus be avoided and the time required for handover is shortened accordingly (speeding up of handover). At the same time, advantages of TLS authentication using an electronic certification form (such as high security) can be maintained.

Figure 5:
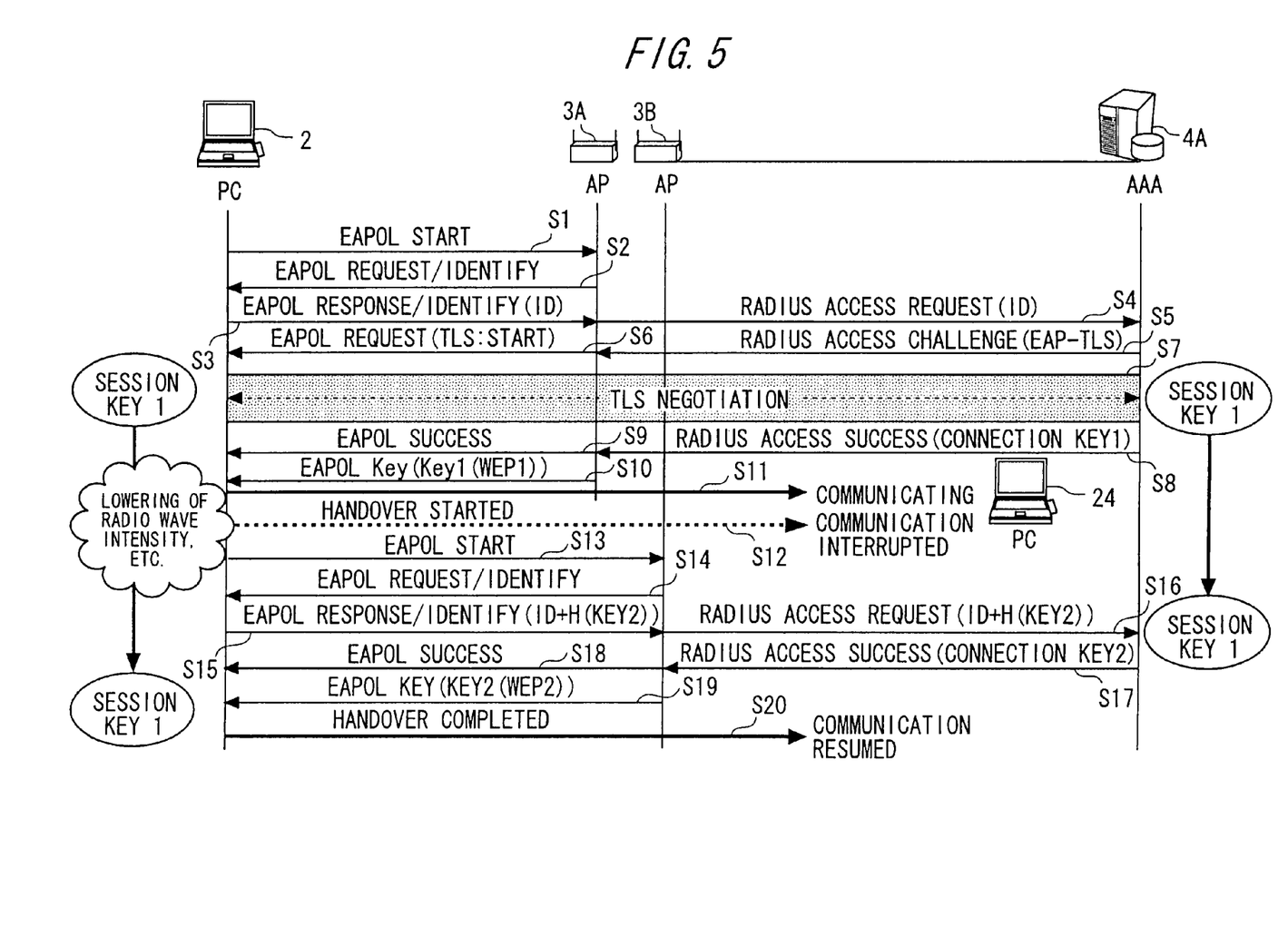
FIG. 5 is a sequence diagram showing handover processing in the system according to the embodiment of the present invention.

A premise of the sequence shown in FIG. 5 is that the access point 3A and the access point 3B are connected to the authentication server 4A via a secure network. Therefore, a connection key from the authentication server 4A is distributed only to a correct access point. In the sequence, the same level of security as attained through server authentication can be kept if the wireless terminal 2 decrypts the encryption key (2) that has been encrypted by and sent from the access point 3B to make encrypted communications with the access point 3B possible and obtain an IP address and other information properly. In short, the intervention of an unauthorized access point can be avoided, which is achieved only by authentication that uses an electronic certification form.

Also, a one-time-only connection key can be created by including a dynamic element (e.g., random numbers) that can be shared between a wireless terminal and an authentication server in calculating a connection key. This prevents a third party eavesdropping on information in a wireless section between a wireless terminal and an access point from intercepting authentication information from the wireless section information. In the case where the speed takes priority, however, an old connection key may be reused instead of calculating a new connection key.

<Example of Handover Processing in Wireless Terminal>

Figure 6:
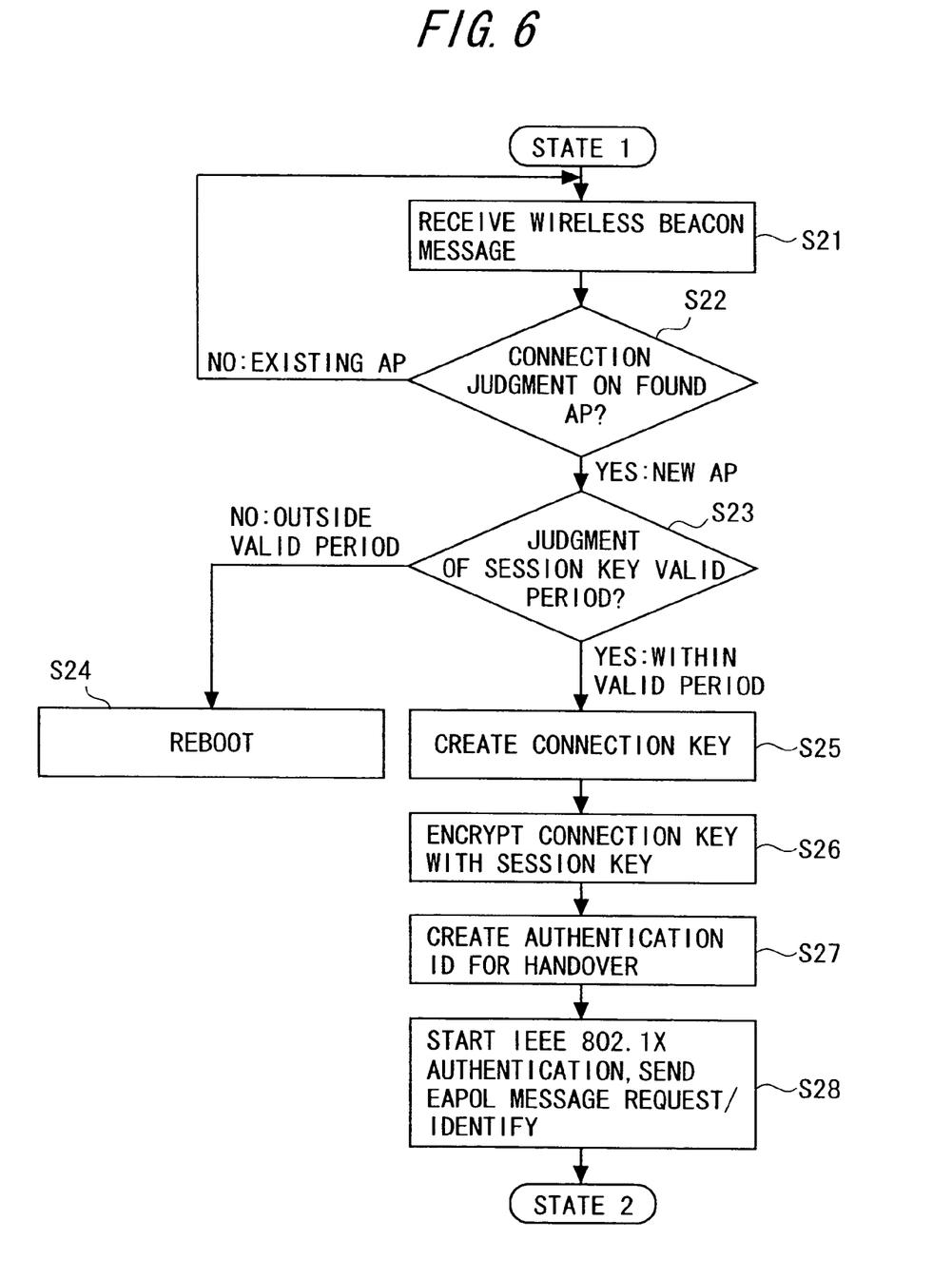
FIG. 6 is a first flow chart showing processing in the wireless terminal according to the embodiment of the present invention.
Figure 7:
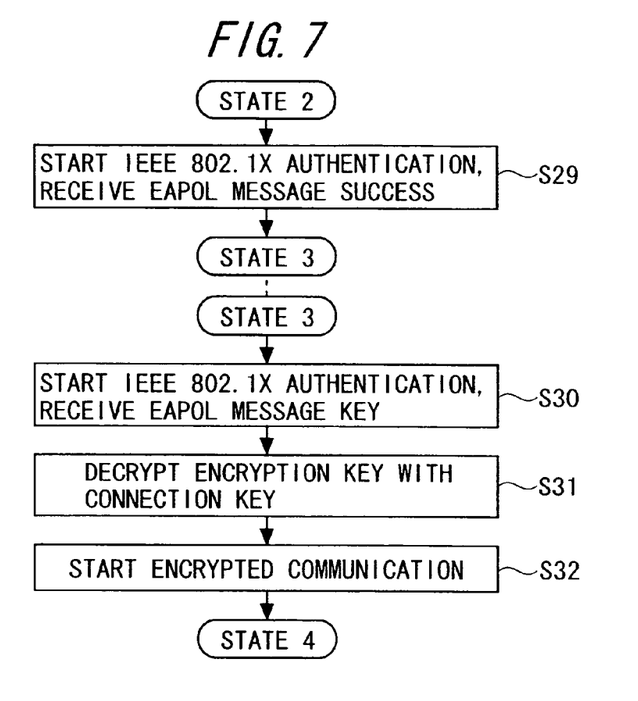
FIG. 7 is a second flow chart showing processing in the wireless terminal according to the embodiment of the present invention.
Figure 8:
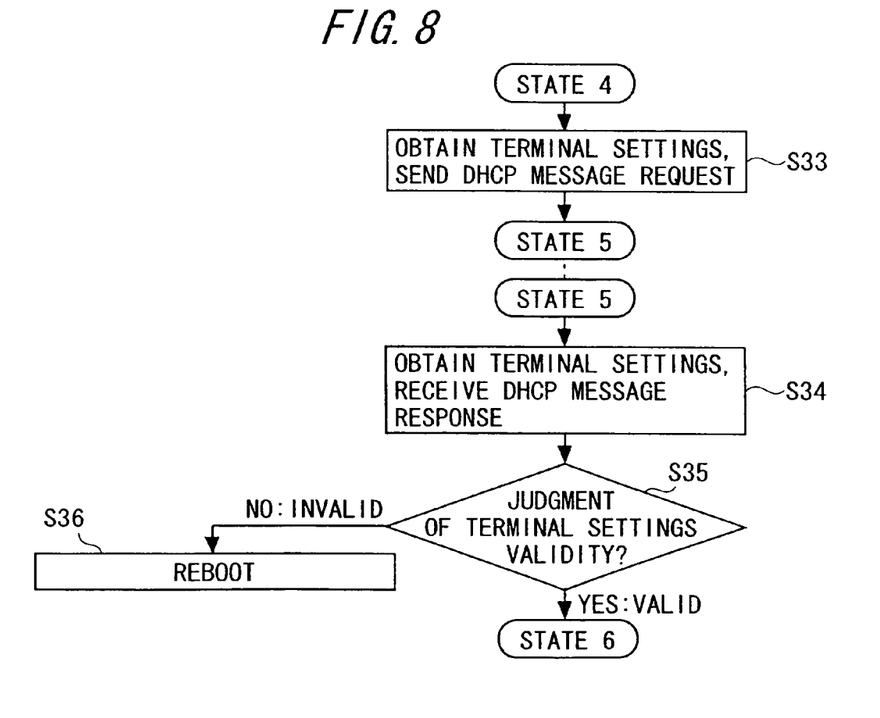
FIG. 8 is a third flow chart showing processing in the wireless terminal according to the embodiment of the present invention.

FIGS. 6, 7 and 8 are flow charts showing handover processing in the wireless terminal 2. Processing of the wireless terminal 2 that is shown in FIG. 6 will be described first. The processing of FIG. 6 corresponds to the processing performed by the wireless terminal 2 in Steps S12 to S14 of the sequence diagram shown in FIG. 5. To be specific, the wireless terminal 2 in FIG. 6 is in a state 1, which is between Step S10 and Step S13 (right before Step S13) and in which the wireless terminal 2 searches for a handover destination access point.

The handover processing portion 8 receives from an access point a radio beacon signal (a message indicating that the wireless terminal 2 can log on to this access point) (Step S21).

The handover processing portion 8 judges whether the sender of the beacon signal is the access point to which the wireless terminal 2 has been logged on (for example, the access point 3A) or a new access point (the access point 3B, for example) (Step S22).

In the case where the found access point is the one to which the wireless terminal 2 has been logged on, the handover processing portion 8 returns to the processing of Step S21. On the other hand, in the case where the found access point is judged as a new access point (S22: YES), the handover processing portion 8 proceeds to processing of Step S23.

In Step S23, the electronic certification form processing portion 10 judges whether or not the current time is within the valid period of a session key (the session key (1)) held in the electronic certification form•key database portion 11 (Step S23).

Judging that the current time is not in the valid period of the session key (1) (S23: NO), the electronic certification form processing portion 10 reboots the wireless terminal 2 (Step S24). In the case where it is judged that the current time is within the valid period of the session key (1) (S23: YES), the wireless terminal 2 proceeds to processing of Step S25.

The key processing portion 9 creates the connection key (2) from the kept session key (1) using a given calculation method (e.g., hash function) (Step S25).

The key processing portion 9 next encrypts the created connection key (2) with the session key (1) (Step S26).

The key processing portion 9 next creates the handover authentication ID 21 (see FIG. 4) (Step S27). For handover of the wireless terminal 2, the key processing portion 9 creates the authentication ID 21 (FIG. 4), which is obtained by attaching the connection key (2) (information stored in the connection key portion 23) that is encrypted with the session key (1) to the rear of an authentication ID (information stored in the user ID portion 22) that is assigned to the wireless terminal 2.

Next, the wireless terminal 2 sends the authentication ID 21 created by the key processing portion 9 to the new access point 3B by the EAPOL protocol (Step S28). Steps S13 and S14 shown in FIG. 5 are sometimes omitted, depending on the manner in which wireless terminals and access points are mounted.

Described next is processing of the wireless terminal 2 in FIG. 7. The processing of FIG. 7 corresponds to the processing performed by the wireless terminal 2 in Steps S18 to S20 of the sequence diagram shown in FIG. 5. A "state 2" in FIG. 7 is a state right before Step S19 of FIG. 5. The wireless terminal 2 receives from the access point 3B a signal indicating the success of the authentication (EAPOL Success) (Step S29). Thereafter, the state of the wireless terminal 2 shifts to a "state 3", which is a state right before Step S20 of FIG. 5.

The wireless terminal 2 receives, from the access point 3B, the encryption key (2) that has been encrypted with the connection key (2) and that makes encrypted communications between the wireless terminal 2 and the other wireless terminal 24 possible (Step S30).

The key processing portion 9 uses the connection key (2) to decrypt the encryption key (2) that has been encrypted with the connection key (2), and obtains the encryption key (2) for communicating with the other wireless terminal 24 (Step S31).

Using the obtained encryption key (2), the wireless terminal 2 starts encrypted communications (Step S32). The wireless terminal 2 thereafter shifts to a "state 4", which is a state right after Step S12.

Processing shown in FIG. 8 corresponds to processing performed by the wireless terminal 2 in Step S20 and subsequent steps of the sequence diagram of FIG. 5.

The DHCP protocol processing portion 12 sends, to the access point 3B, a request message by DHCP (Dynamic Host Configuration Protocol), for dynamically assigning an IP address to the wireless terminal 2 (IP address request message) (S33). Thereafter, the wireless terminal 2 enters a "state 5".

The DHCP protocol processing portion 12 receives a DHCP message response (containing an IP address) from the access point 3B (Step S24).

The DHCP protocol processing portion 12 judges the validity of terminal settings. In the case where encrypted communications with an access point are normal, the DHCP protocol processing portion 12 receives a DHCP message response that contains a normal IP address. On the other hand, when there is a trouble in the encrypted communications, the DHCP protocol processing portion 12 receives a DHCP message response that contains an abnormal IP address. The DHCP protocol processing portion 12 judges whether terminal settings are valid or invalid by judging whether an IP address obtained from a DHCP message response is normal or abnormal.

In the case where the obtained IP address is abnormal, the DHCP protocol processing portion 12 judges that the wireless terminal 2 is not carrying out normal encrypted communications and is logging on to an unauthorized access point, thereby determining that the terminal settings are invalid (S35: NO) and performing rebooting processing. In the case where the obtained IP address is normal, the terminal settings are determined as valid (S35: YES), and the wireless terminal 2 enters a "state 6", where the terminal settings processing portion 13 sets the obtained IP address to the wireless terminal 2. This enables the wireless terminal 2 to engage in IP communication using the IP address.

<Example of Handover Processing in Authentication Server>

Figure 9:
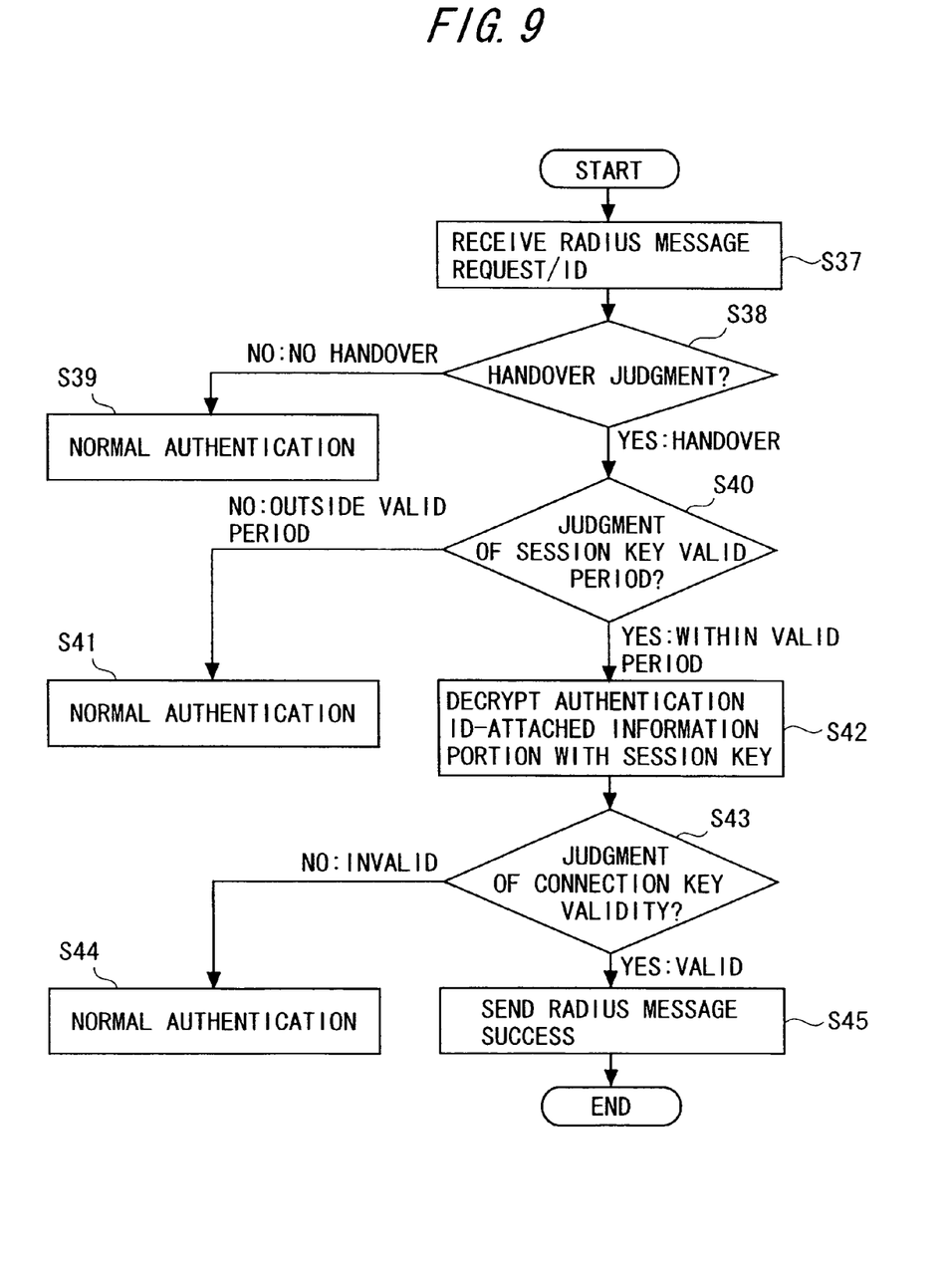
FIG. 9 is a flow chart showing processing in the authentication server according to the embodiment of the present invention.

FIG. 9 is a flow chart showing processing that is performed by the authentication server 4A for handover of the wireless terminal 2. Processing shown in FIG. 9 corresponds to processing performed by the authentication server 4A in Steps S16 to S17 of the sequence diagram of FIG. 5. The processing of FIG. 9 is started right before Step S15 shown in FIG. 5.

The authentication server 4A first receives the authentication ID of the wireless terminal 2 from the wireless terminal 2 via the access point 3B (Step S37).

The authentication server 4A next judges whether handover is in order or not (Step S38). Whether handover is about to be performed or not is judged from whether or nor there is additional information (a connection key) attached to the authentication ID. To be specific, the key processing portion 18 judges whether or not information is contained in the connection key portion 23 of the authentication ID 21 (see FIG. 4). When it is judged that additional information is not contained in the connection key portion 23, the key processing portion 18 judges that handover is not in order (S38: NO), and performs normal authentication processing (Step S39). When additional information is contained in the connection key portion 23, the key processing portion 18 judges that handover is in order (Step S38: YES).

The key processing portion 18 judges whether or not the current time is within the valid period of the session key (1) that is kept in the electronic certification form•key data processing portion 14 (S40). Judging that the current time is not in the valid period (S40: NO), the key processing portion 18 performs normal authentication processing (TLS negotiation) (Step S41). Judging that the current time is within the valid period (S40: YES), the key processing portion 18 proceeds to processing of Step S42.

In the processing of Step S42, the key processing portion 18 obtains the connection key (2) by decrypting the additional information that is stored in the connection key portion 23 of the authentication ID 21 with the session key (1) that is kept in the electronic certification form•key database portion 20 (S42).

The key processing portion 18 judges whether or not the connection key (2) obtained from the wireless terminal 2 via the access point 3B is valid (S43). The connection key (2) is created by a given method in the wireless terminal 2. The key processing portion 18 can therefore judge the validity of the connection key (2) by creating a connection key from the session key (1) using the same given method and comparing the created connection key with the connection key (2) that is obtained from the wireless terminal 2.

The key processing portion 18 judges the connection key (2) as invalid when the two connection keys do not match (S43: NO). In this case, normal authentication processing (TLS negotiation) is executed. The key processing portion 18 judges the connection key (2) as valid when the two connection keys match (S43: YES). In this case, the authentication server 4A sends a message indicating the success of the authentication (RADIUS Access Success) to the access point 3B. Thereafter, the authentication server 4A performs the same operation as the existing authentication function.

<Example of Modification>

The wireless terminal 2 (see FIG. 5) in this embodiment creates the connection key (2) from the session key (1) using a given method. Alternatively, the wireless terminal 2 may create the connection key (2) from the connection key (1), instead of from the session key (1), to send the connection key (2) that is encrypted with the connection key (1) to the authentication server 4A. In this case, the authentication server 4A (see FIG. 5) creates the connection key (2) from the connection key (1) and decrypts the connection key (2) that is encrypted by and sent from the wireless terminal 2 with the connection key (1), to thereby judge whether or not the connection key (2) from the wireless terminal 2 is a valid key.

<<Others>>

The disclosures of Japanese patent application No. JP2006-090494 filed on Mar. 29, 2006 including the specification, drawings and abstract are incorporated herein by reference.

What is claimed is:

1. A wireless terminal which executes authentication processing between the wireless terminal itself and an authentication device when forming a wireless connection with a base station, and which shares, with the authentication device, a connection key for creating an encryption key that is used in wireless communications with a base station, comprising:

a storage portion to store a session key, which is created in authentication processing executed between the wireless terminal and the authentication device when the wireless terminal logs on to a first base station, and which is shared with the authentication device;

a creation portion that creates, from the session key which is stored in the storage portion, when the connection destination is switched from the first base station to a second base station, a new connection key for creating an encryption key that is used in wireless communications with the second base station;

a unit to notify the authentication device of the new connection key via the second base station;

a unit to receive, from the second base station, when the new connection key is judged to be valid by the authentication device through validity judging processing with the use of the session key, an encryption key that is used in wireless communications between the wireless terminal and the second base station, the received encryption key being created from the new connection key, which is notified from the authentication device to the second base station, and being encrypted with the new connection key; and a unit to decrypt the encrypted encryption key with the new connection key and executing wireless communications with the second base station using the encryption key.

2. The wireless terminal according to claim 1, in which, when switching is made to the second base station, the new connection key is sent to the authentication device along with an authentication identifier of the wireless terminal.

3. The wireless terminal according to claim 1, further comprising:

a unit to receive an IP address that is to be used by the wireless terminal from the second base station through wireless communications with the second base station using the encryption key; and a unit to determine whether the received IP address is valid or not and, when the IP address is invalid, determining that the second base station is unauthorized.

4. A non-transitory computer-readable medium storing a program for making a computer function as a wireless terminal which executes authentication processing between the wireless terminal itself and an authentication device when forming a wireless connection with a base station, and which shares, with the authentication device, a connection key for creating an encryption key that is used in wireless communications with a base station, the program causing the computer to execute:

storing a session key, which is created in authentication processing executed between the wireless terminal and the authentication device when the wireless terminal logs on to a first base station, and which is shared with the authentication device, in a storage portion;

creating, from the session key which is stored in the storage portion, when the connection destination is switched from the first base station to a second base station, a new connection key for creating an encryption key that is used in wireless communications with the second base station;

notifying the authentication device of the new connection key via the second base station;

receiving, from the second base station, when the new connection key is judged to be valid by the authentication device through validity judging processing with the use of the session key, an encryption key that is used in wireless communications between the wireless terminal and the second base station, the received encryption key being created from the new connection key, which is notified from the authentication device to the second base station, and being encrypted with the new connection key; and decrypting the encrypted encryption key with the new connection key and executing wireless communications with the second base station using the encryption key.

5. An authentication device which executes authentication processing between the authentication device itself and a wireless terminal when the wireless terminal starts wireless communications with a base station, and which shares, with the wireless terminal, a connection key for creating an encryption key that is used in the wireless communications, comprising:

a storage portion to store a session key, which is created in authentication processing executed between the wireless terminal and the authentication device when the wireless terminal starts wireless communications with a first base station, and which is shared with the wireless terminal;

a unit to receive, when the wireless terminal switches the connection destination from the first base station to a second base station, a new connection key for creating an encryption key that is created by the wireless terminal to be used in wireless communications with the second base station, the new connection key being created by the wireless terminal from the session key shared and being received via the second base station;

a judging portion to determine whether the new connection key received is valid or not with the use of the session key; and a unit to notify, when the new connection key is valid, the second base station of the new connection key without performing the authentication processing, thereby enabling the second base station to send an encryption key to the wireless terminal.

6. The authentication device according to claim 5, in which the judging portion creates a new connection key from the session key by the same creation method that is used by the wireless terminal in creating the new encryption key, and judges that the received connection key is valid when the created new connection key matches the received connection key.

7. The authentication device according to claim 5, in which an authentication identifier of the wireless terminal is received when switching is made from the first base station to the second base station, and in which the validity judging is executed when the authentication identifier has a new connection key attached thereto whereas authentication processing is executed between the authentication device and the wireless terminal when the authentication identifier does not have a new connection key attached thereto.

8. A non-transitory computer-readable medium storing a program for making a computer function as an authentication device which executes authentication processing between itself and a wireless terminal when the wireless terminal starts wireless communications with a base station, and which shares, with the wireless terminal, a connection key for creating an encryption key that is used in the wireless communications, the program causing a computer to execute:

storing a session key, which is created in authentication processing executed between the wireless terminal and the authentication device when the wireless terminal starts wireless communications with a first base station, and which is shared with the wireless terminal;

receiving, when the wireless terminal switches the connection destination from the first base station to a second base station, a new connection key for creating an encryption key that is created by the wireless terminal to be used in wireless communications with the second base station, the new connection key being created by the wireless terminal from the session key shared and being received via the second base station;

determining whether the new connection key received is valid or not with the use of the a session key; and notifying, when the new connection key is valid, the second base station of the new connection key without performing the authentication processing, thereby enabling the second base station to send an encryption key to the wireless terminal.

* * * * *